(12) United States Patent
Hancock et al.

(10) Patent No.: US 7,903,567 B2
(45) Date of Patent: Mar. 8, 2011

(54) METHOD OF TESTING THE AVAILABILITY OF A CONNECTION TO A HOME AUTHENTICATION SERVER PRIOR TO ASSOCIATING WITH A WLAN ACCESS POINT

(75) Inventors: Robert Hancock, Southampton (GB); Eleanor Hepworth, Southampton (GB); Stephen McCann, Southampton (GB)

(73) Assignee: Siemens Aktiengesellschaft, Munich (DE)

( * ) Notice: Subject to any disclaimer, the term of this patent is extended or adjusted under 35 U.S.C. 154(b) by 695 days.

(21) Appl. No.: 11/662,270

(22) PCT Filed: Sep. 7, 2005

(86) PCT No.: PCT/GB2005/003426
§ 371 (c)(1),
(2), (4) Date: Feb. 12, 2008

(87) PCT Pub. No.: WO2006/027564
PCT Pub. Date: Mar. 16, 2006

(65) Prior Publication Data
US 2008/0259881 A1    Oct. 23, 2008

(30) Foreign Application Priority Data

Sep. 9, 2004 (GB) .................................. 0419927.9
Nov. 2, 2004 (GB) .................................. 0424189.9

(51) Int. Cl.
*H04L 12/26* (2006.01)

(52) U.S. Cl. .......... 370/243; 370/242; 370/312; 370/390
(58) Field of Classification Search .................. None
See application file for complete search history.

(56) References Cited

U.S. PATENT DOCUMENTS

| | | | | |
|---|---|---|---|---|
| 7,042,988 B2 * | 5/2006 | Juitt et al. | .................. | 379/88.17 |
| 7,292,592 B2 * | 11/2007 | Rune | .............................. | 370/401 |
| 7,366,509 B2 * | 4/2008 | Akgun et al. | .............. | 455/435.1 |
| 7,606,242 B2 * | 10/2009 | Whelan et al. | ................ | 370/401 |
| 7,694,017 B2 * | 4/2010 | Saitoh | ........................... | 709/245 |
| 2001/0023446 A1 | 9/2001 | Balogh | | |
| 2002/0040390 A1 | 4/2002 | Sullivan et al. | | |
| 2002/0065785 A1 * | 5/2002 | Tsuda | .............................. | 705/67 |

FOREIGN PATENT DOCUMENTS

GB        2 348 778        10/2000

(Continued)

OTHER PUBLICATIONS

Siemens AG, Public Communication Network Group: "Information—Call Handling—Roaming", 1996, pp. 1-20.

(Continued)

*Primary Examiner* — Donald L Mills
(74) *Attorney, Agent, or Firm* — Staas & Halsey LLP

(57) ABSTRACT

A method of determining availability of a connection between a wireless local area network and a home network of a mobile user device prior to initiating connection or authentication comprises selecting a network device; and sending a probe signaling message comprising a user device to the selected network device. The network device uses this home identifier data to formulate a signaling message that it sends towards the appropriate home network to contract a home authentication server. An indication to the user device of the result of the attempt is returned.

14 Claims, 1 Drawing Sheet

FOREIGN PATENT DOCUMENTS

| | | |
|---|---|---|
| GB | 2 400 273 | 10/2004 |
| WO | 03/088578 | 10/2003 |
| WO | 2004/064306 | 7/2004 |

OTHER PUBLICATIONS

3GPP: "3$^{rd}$ Generation Partnership Project; Technical Specification Group Services and System Aspects; 3GPP System to Wireless Local Area Network (WLAN) Interworking; System Description (Release 6)", 3GPP TS 23.234 V6.1.0, Jun. 2004, pp. 1-94.

3GPP: "3$^{rd}$ Generation Policy Partnership Project: Technical Specification Group Core Network; 3GPP System to WLAN Interworking; UE to Network Protocols; Stage 3 (Release 6)", 3GPP TS 24.234 V1.6.0.0, Aug. 2004, pp. 1-24.

The International Search Report in PCT/GB2005/003426, filed in the present application on Mar. 9, 2007.

The UK Search Report in GB0424189.9, filed in the present application on Mar. 9, 2007.

\* cited by examiner

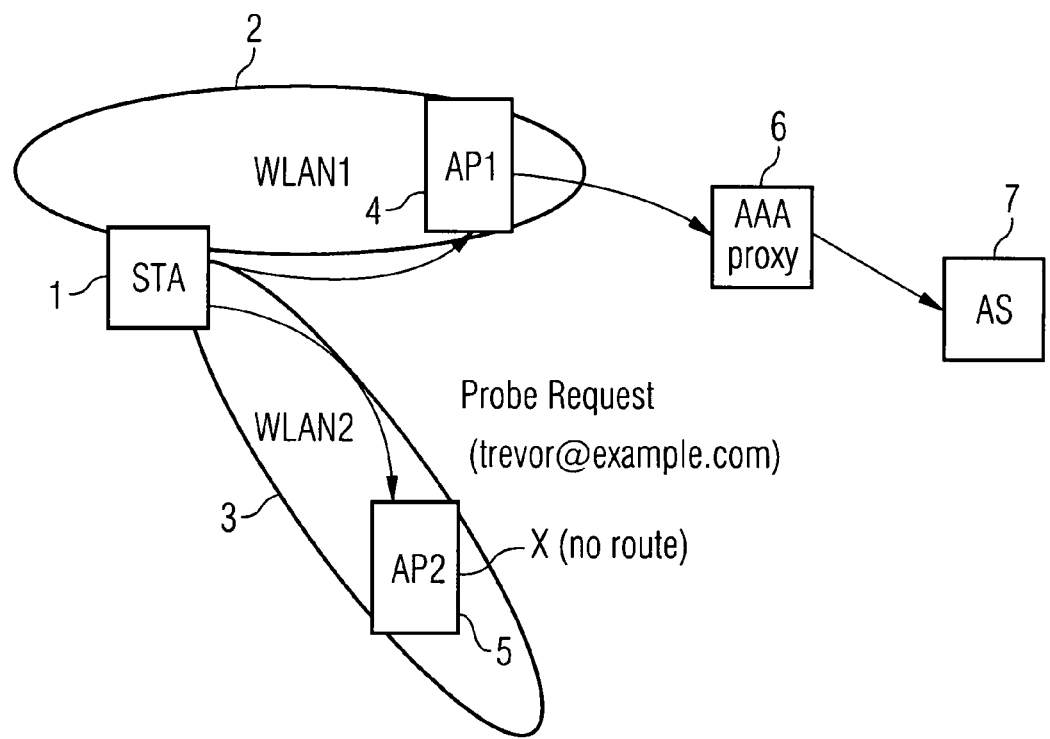

METHOD OF TESTING THE AVAILABILITY OF A CONNECTION TO A HOME AUTHENTICATION SERVER PRIOR TO ASSOCIATING WITH A WLAN ACCESS POINT

CROSS REFERENCE TO RELATED APPLICATIONS

This application is based on and hereby claims priority to Application No. PCT/GB2005/003426 filed on Sep. 7, 2005, Great Britain Application No. 0419927.9 filed on Sep. 9, 2004 and Great Britain Application No. 0424189.9, filed on Nov. 2, 2004, the contents of which are hereby incorporated by reference.

BACKGROUND

This invention relates to a method of determining availability of a wireless network connection between a local network and a home network of a mobile user device prior to initiating connection or authentication.

There are a rising number of public wireless local area network (PWLAN) hotspots and a variety of service providers now offering PWLAN services. Many of these operators offer access to users of differing roaming partners.

When a user initially enters an area of coverage of one or more hotspots, it is useful for the user device to be able to determine dynamically the capabilities of a physical network before deciding what to do with that network, e.g. to determine whether authentication will be possible within that hotspot without having to initiate a lengthy authentication exchange that may fail for a variety of reasons, or to carry out other functions, such as association and service selection. Instead, it is better to have some initial information discovered by the user device or terminal to allow it to decide whether a suitable roaming agreement is in place to allow the user to authenticate with the network. This also supports selection of subscription credentials for users that may have relationships with multiple operators.

Therefore, once the initial determination has been made the user can select the hotspot and user credentials with the knowledge that authentication has a good chance of success, since the appropriate roaming agreements are in place.

Existing solutions extend current network-to-user device protocol exchanges to include a listing of roamed operator information. For example, solutions that include a list of roamed operators within the extensible authentication protocol (EAP) Request/Identity message are being developed within the internet engineering task force (IETF). However, there are restrictions on the amount of information that can be included in this way. For future networks where the list of roaming agreements might be quite extensive, these approaches do not offer a long term solution.

Siemens AG (XP-002358194) Information—call handling-roaming 1996, pages 1 to 20 describes features of roaming for cellular subscribers.

WO2004/064306 describes a wireless LAN system in which a request to authenticate a mobile station results in network identification and service information about the service provider being returned.

SUMMARY

The inventors propose a method of determining availability of a wireless network connection between a local network and a home network of a mobile user device prior to initiating connection or authentication, comprises selecting a network device; and sending a signaling message from the user device to the network device including an identifier for the user device; characterised in that a plurality of network devices may be selected in parallel; wherein the wireless network is a public wireless local area network; wherein the signaling message includes home identifier data of the user device; wherein the network device formulates a protocol signaling message, using the home identifier data, that the network device sends towards the home network to test availability of a relationship between the network device and the user device's home network; and wherein an indication is returned to the user device of the result of the attempt.

The method may allow the user device to determine whether or not any sort of connection or authentication with the network is possible; and even if possible, whether it is worthwhile for the mobile user device, before it actually initiates a connection or authentication dialogue. Having determined what is possible, the mobile user device can make an informed choice without wasting time and resources attempting functions that are not actually possible with a specific network. Selecting a plurality of network devices in parallel allows for some attempts being unsuccessful, without increasing the overall time taken to determine which network device would allow that mobile device to make a connection.

Typically, the home identifier data comprises a home realm of the user device, with which the user expects to authenticate; a home network; or a home user subscription. The identifier may precisely identify the user subscription or provide just include enough information to identify the home network.

Preferably, service information can be provided with the return indication, if the result is success. This information could be, for example, cost per minute for a connection, to aid the user in deciding whether to take up that connection.

Preferably, the network device is a wireless gateway, such as a base station or access point. The access point is dependent upon the technology concerned, for IEEE 802.11 technology, for example, the access point is a public wireless local area network (PWLAN) hotspot. The method is applicable to many technologies, such as UWB, IEEE 802.16, IEEE 802.20 and suitable access points are chosen according to the technology.

The message can be any type of protocol which can obtain the required data, but preferably the message is an authentication, authorization and accounting protocol signaling message.

The identifier may be an identifier for a user subscription, but preferably, the identifier comprises a network access identifier.

Typical user devices are any personal terminal including laptops, mobile phones, personal digital assistants, or multimedia entertainment terminals, or gateway units such as those found in aircraft, trains or ships.

BRIEF DESCRIPTION OF THE DRAWINGS

These and other objects and advantages will become more apparent and more readily appreciated from the following description of the preferred embodiments, taken in conjunction with the accompanying drawings of which:

FIG. 1 is a block diagram illustrating the method according to one potential embodiment of the present invention.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

FIG. 1 shows a mobile station (STA), or user device 1 which has detected the presence of two suitable base stations or access points AP1 and AP2 4, 5 via which it might like to communicate with the local network. The user may already be associated with another access point (AP), or may have detected several APs in the vicinity belonging to two different network operators (e.g. within an airport business lounge). The example embodiment of FIG. 1, assumes an IEEE 802.11 wireless local area network (WLAN) device and AP, but the invention is not limited to WLAN. In order to assist the user device 1 in deciding which AP to associate with, the user device needs to try and discover whether it can authenticate via both networks. To do this the user device 1 sends a Probe Request layer 2 signaling message via respective WLAN1 and WLAN2 2, 3 to each access point 4, 5, including a network access identifier (NAI) in the message. The user device 1 includes information about the home realm with which the user expects to authenticate, in this case by including the NAI, e.g. trevor@example.com, in this message.

The AP uses the realm information to formulate a protocol signaling message, such as an authentication, authorization and accounting (AAA) protocol signaling message that it sends towards the appropriate home network, using the AAA routing infrastructure already in place. In this example, the APs 4, 5 attempt to dynamically establish a path to an authorization server 7 using the realm information, example.com, from the NAI to try and contact the appropriate home authentication server through the network and, if successful, returns this result to the user device 1. The route via WLAN2 3 proves to be a dead end, but the route via AP1 4 uses an AAA routing infrastructure 6 that is already in place, i.e. the proxies and relays along the route have realm based routing tables configured in them for routing AAA requests. These are used to work out whether a suitable path exists to the home authentication server. The same path may be ultimately used for authentication, if the user decides to proceed.

If the attempt to contact the home server is unsuccessful, an error message is returned to the user device 1 and if the attempt is successful, a message is returned to the user device 1, indicating that this is a suitable network with which to initiate a connection or authentication.

The method may allow a device wishing to connect to, or authenticate with, the local network to dynamically discover whether suitable roaming agreements are in place between the local networks and their home network at the link layer, i.e. before any state related to the user device has been installed in the network beyond the APs 4, 5, both at layer 2 and layer 3. A multimode terminal may be capable of communicating with a plurality of disparate wireless technologies, destination networks and mobile operators. This proposed method may allow such a terminal to gather information about all possible combinations of communication channels, before the user attempts to associate, authenticate and select services. In future it is likely that terminals capable of simultaneous communication over multiple radio bearers to different physical networks will continuously, or at least at regular intervals, seek out fundamental network capabilities, which if available, the user device may then choose to take up.

In the proposed method the user device wishing to discover information about the network can do so without having to have any relationship in place (e.g. pre-association) with the base station, other than being within physical communication range. This allows investigations to be initiated across multiple base stations simultaneously with a low management overhead.

The user device is able to discover suitable networks to authenticate with, associate or select services, prior to associating with all possible networks. This reduces not only the amount of signaling and use of connection setup, but also provides a fast efficient network discovery mechanism. Failure to detect a route through to the home network indicates to the user device that an association with that local network AP is pointless, even if it appears to be the best AP from a wireless environment point of view. Also, failure can be put down to a lack of route through to the home network much quicker, as opposed to trying to carry out a more sophisticated EAP exchange and the exchange failing for some mildly ambiguous reason. This can be deduced from how far through the authentication procedure one successfully reaches, i.e. where into the EAP method one stops.

The probe up and back through the AAA infrastructure 6 can be used to gather information, as the message travels in both directions, about the service available to the user, especially including simple cost or authorization aspects. This sort of information would be very hard to advertise generically since it depends on the roaming chain. Referring back to FIG. 1, it can be seen that although AP1 4 returns a successful roaming route, if the cost of using this route is high (e.g. $10/minute), the user device 1 still may decide not to connect through this routing.

Other benefits are that the user does not have to reveal their full identity, just an identifier for their user subscription, to test if there is a connection to their home server, so there are few privacy concerns. The amount of information to be advertised in beacons is reduced. The mechanism can be operated pre-association, so the probe/response can be carried out even while the user is associated with a different AP, whereas other solutions require the user to associate first, therefore causing a service interruption.

The system is backwards compatible, making use of appropriate formats of the probe request and response and it will work with unmodified APs, i.e. an unmodified AP returns a meaningful 'don't know' response except in the very rare case of an NAI collision with an existing beacon message, service set identifier (SSID).

Even if roaming is not supported, other information can be returned as an alternative, such as "I don't roam with that operator, but I do allow on-line signup.", or a textual comment can be returned. The method does not require an EAP extension and has no direct interaction with other protocol state machines over the air, since it just gives a hint about whether to authenticate or not, so it does not compromise existing security mechanisms or mean that they have to be re-implemented. The method can be implemented in a simple self-contained way inside the terminal lower layers. It can also probe for a plurality of NAIs in parallel by just sending multiple probes.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method of determining availability of a network connection between a public wireless local area network and a home network of a mobile user device, the method comprising:
   sending a signaling message in parallel from the user device to a plurality of network devices, each network device being associated with a public wireless local area network, the signaling message including a home identifier that identifies the home network of the user device;
   formulating a protocol signaling message at each network device using the home identifier;
   for each protocol signaling message, attempting to send the protocol signaling message from the network device to the home network to test availability of a relationship between the network device and the home network; and
   if a network connection is available between the public wireless local area network and the home network, returning an indication of availability to the user device, the indication of availability being returned before the user device attempts to initiate or authenticate the connection.

2. A method according to claim 1, wherein the home identifier contains information regarding at least one of a home realm of a user device, with which the user expects to authenticate; and a home user subscription.

3. A method according to claim 1, wherein service information is provided with the indication of availability.

4. A method according to claim 1, wherein each network device is a base station or an access point.

5. A method according to claim 4, wherein the access point is a public wireless local area network hotspot.

6. A method according to claim 1, wherein the message is an authentication, authorization and accounting protocol signaling message.

7. A method according to claim 1, wherein the home identifier comprises a network access identifier.

8. A method according to claim 1, wherein the user device comprises one of a laptop, a mobile phone, a personal digital assistant and a multimedia entertainment terminal.

9. A method according to claim 2, wherein service information is provided with the indication of availability.

10. A method according to claim 9, wherein each network device is a base station or an access point.

11. A method according to claim 10, wherein the access point is a public wireless local area network hotspot.

12. A method according to claim 11, wherein the message is an authentication, authorization and accounting protocol signaling message.

13. A method according to claim 12, wherein the home identifier comprises a network access identifier.

14. A method according to claim 13, wherein the user device comprises one of a laptop, a mobile phone, a personal digital assistant and a multimedia entertainment terminal.

* * * * *